(12) United States Patent
Chu et al.

(10) Patent No.: US 8,027,265 B2
(45) Date of Patent: Sep. 27, 2011

(54) PROVIDING A CAPABILITY LIST OF A PREDEFINED FORMAT IN A COMMUNICATIONS NETWORK

(75) Inventors: Chung Cheung Chu, Brossard (CA); Rafi Rabipour, Cote Saint-Luc (CA)

(73) Assignee: Genband US LLC, Plano, TX (US)

( * ) Notice: Subject to any disclaimer, the term of this patent is extended or adjusted under 35 U.S.C. 154(b) by 854 days.

(21) Appl. No.: 11/589,435

(22) Filed: Oct. 30, 2006

(65) Prior Publication Data
US 2007/0104114 A1 May 10, 2007

Related U.S. Application Data

(63) Continuation-in-part of application No. PCT/IB2005/000730, filed on Mar. 21, 2005.

(60) Provisional application No. 60/731,358, filed on Oct. 28, 2005, provisional application No. 60/554,605, filed on Mar. 19, 2004.

(51) Int. Cl.
*H04L 12/26* (2006.01)
(52) U.S. Cl. ..... 370/252; 375/224; 379/1.01; 379/32.01
(58) Field of Classification Search .................. 370/241, 370/252; 714/100, 1, 2, 3, 4; 455/130–355, 455/403, 414.1; 375/224, 227, 242, 254; 379/1.01–35
See application file for complete search history.

(56) References Cited

U.S. PATENT DOCUMENTS

| | | | |
|---|---|---|---|
| 3,652,798 A | 3/1972 | McNeilly et al. | |
| 4,048,446 A | 9/1977 | Hafner et al. | |
| 4,455,649 A | 6/1984 | Esteban et al. | |
| 4,545,052 A | 10/1985 | Steierman | |
| 5,295,136 A | 3/1994 | Ashley et al. | |
| 5,375,121 A | 12/1994 | Nishino et al. | |
| 5,612,957 A | 3/1997 | Gregerson et al. | |
| 5,710,976 A | 1/1998 | Hill et al. | |
| 5,740,157 A | 4/1998 | Demiray et al. | |
| 5,905,873 A | 5/1999 | Hartmann et al. | |
| 5,930,264 A | 7/1999 | Nguyen | |
| 5,933,487 A | 8/1999 | Strickland | |
| 5,995,923 A | 11/1999 | Mermelstein et al. | |
| 5,999,529 A | 12/1999 | Bernstein et al. | |

(Continued)

FOREIGN PATENT DOCUMENTS

CA   2 336 699   1/2000

(Continued)

OTHER PUBLICATIONS

3GPP TSG-TrFO Workshop #4, Meeting Report v3.0.0, (Oct. 17-19, 2000).*

(Continued)

*Primary Examiner* — Hassan Kizou
*Assistant Examiner* — Charles C Jiang
(74) *Attorney, Agent, or Firm* — Jenkins, Wilson, Taylor & Hunt, P.A.

(57) ABSTRACT

In a communications network having plural nodes, a first node receives a capability list that has a predefined format and includes plural entries identifying corresponding data processing functions supported by one or more nodes along a communications path of a communications session involving the first node. The first node adds at least one additional entry into the capability list in response to determining that the first node supports a data processing function that is not identified in the capability list.

23 Claims, 7 Drawing Sheets

U.S. PATENT DOCUMENTS

| | | | |
|---|---|---|---|
| 6,006,189 A | 12/1999 | Strawczynski et al. | |
| 6,009,467 A | 12/1999 | Ratcliff et al. | |
| 6,026,086 A | 2/2000 | Lancelot et al. | |
| 6,031,904 A * | 2/2000 | An et al. | 379/201.02 |
| 6,046,999 A | 4/2000 | Miki et al. | |
| 6,078,595 A | 6/2000 | Jones et al. | |
| 6,141,784 A | 10/2000 | Davis et al. | |
| 6,144,667 A | 11/2000 | Doshi et al. | |
| 6,147,988 A | 11/2000 | Bartholomew et al. | |
| 6,172,990 B1 | 1/2001 | Deb et al. | |
| 6,185,424 B1 | 2/2001 | Pon et al. | |
| 6,246,879 B1 | 6/2001 | Segura et al. | |
| 6,256,612 B1 | 7/2001 | Vo et al. | |
| 6,272,358 B1 | 8/2001 | Brent et al. | |
| 6,275,578 B1 | 8/2001 | De Trana et al. | |
| 6,295,302 B1 | 9/2001 | Hellwig et al. | |
| 6,298,055 B1 | 10/2001 | Wildfeuer | |
| 6,324,409 B1 | 11/2001 | Shaffer et al. | |
| 6,324,515 B1 | 11/2001 | Rabipour et al. | |
| 6,339,594 B1 | 1/2002 | Civanlar et al. | |
| 6,353,666 B1 | 3/2002 | Henderson et al. | |
| 6,389,016 B1 | 5/2002 | Sabaa et al. | |
| 6,392,993 B1 | 5/2002 | Hamilton et al. | |
| 6,414,964 B1 | 7/2002 | Holmquist et al. | |
| 6,424,637 B1 | 7/2002 | Pecen et al. | |
| 6,463,454 B1 | 10/2002 | Lumelsky et al. | |
| 6,549,945 B1 | 4/2003 | Sinibaldi et al. | |
| 6,553,423 B1 * | 4/2003 | Chen | 709/230 |
| 6,574,469 B1 | 6/2003 | Xiang et al. | |
| 6,600,738 B1 | 7/2003 | Alperovich et al. | |
| 6,614,781 B1 | 9/2003 | Elliott et al. | |
| 6,625,169 B1 | 9/2003 | Tofano | |
| 6,647,428 B1 | 11/2003 | Bannai et al. | |
| 6,658,064 B1 | 12/2003 | Rotola-Pukkila et al. | |
| 6,671,367 B1 | 12/2003 | Graf et al. | |
| 6,693,996 B2 | 2/2004 | Mansfield | |
| 6,721,269 B2 | 4/2004 | Cao et al. | |
| 6,731,627 B1 | 5/2004 | Gupta et al. | |
| 6,731,647 B2 | 5/2004 | Yao | |
| 6,765,931 B1 | 7/2004 | Rabenko et al. | |
| 6,778,517 B1 | 8/2004 | Lou et al. | |
| 6,781,983 B1 | 8/2004 | Armistead | |
| 6,795,437 B1 | 9/2004 | Räsänen et al. | |
| 6,842,461 B2 | 1/2005 | Harris | |
| 6,845,089 B1 | 1/2005 | Gu et al. | |
| 6,850,778 B1 | 2/2005 | Honkala et al. | |
| 6,850,883 B1 | 2/2005 | Kapanen et al. | |
| 6,865,220 B2 | 3/2005 | Abrishami | |
| 6,876,646 B1 | 4/2005 | Dore et al. | |
| 6,885,638 B2 | 4/2005 | Xu et al. | |
| 6,898,208 B1 | 5/2005 | Sligo et al. | |
| 6,944,166 B1 | 9/2005 | Perinpanathan et al. | |
| 6,956,816 B1 | 10/2005 | Alexander et al. | |
| 6,967,958 B2 | 11/2005 | Ono et al. | |
| 6,967,972 B1 | 11/2005 | Volftsun et al. | |
| 6,973,024 B1 | 12/2005 | Joseph et al. | |
| 6,983,163 B2 | 1/2006 | Sato et al. | |
| 6,985,530 B1 | 1/2006 | Zerbe | |
| 6,990,340 B2 | 1/2006 | Tamura et al. | |
| 6,999,459 B1 | 2/2006 | Callon et al. | |
| 7,006,489 B2 | 2/2006 | Li et al. | |
| 7,023,819 B2 | 4/2006 | Falsafi | |
| 7,054,318 B2 | 5/2006 | Eneroth et al. | |
| 7,054,320 B1 | 5/2006 | Lee et al. | |
| 7,058,085 B2 | 6/2006 | Earnshaw et al. | |
| 7,068,623 B1 | 6/2006 | Barany et al. | |
| 7,072,358 B2 | 7/2006 | Suvanen | |
| 7,082,143 B1 | 7/2006 | LeBlanc et al. | |
| 7,085,289 B2 | 8/2006 | Cromer et al. | |
| 7,089,011 B1 | 8/2006 | Mangal | |
| 7,095,733 B1 | 8/2006 | Yarlagadda et al. | |
| 7,103,021 B2 | 9/2006 | Jou | |
| 7,106,701 B2 | 9/2006 | Stümpert et al. | |
| 7,136,375 B1 | 11/2006 | Koistinen | |
| 7,162,024 B2 | 1/2007 | Wah et al. | |
| 7,180,892 B1 | 2/2007 | Tackin | |
| 7,181,209 B2 | 2/2007 | Tamura | |
| 7,203,226 B1 | 4/2007 | Rabipour et al. | |
| 7,233,595 B1 | 6/2007 | Hollis et al. | |
| 7,240,000 B2 | 7/2007 | Harada | |
| 7,245,589 B2 | 7/2007 | Neulist et al. | |
| 7,245,931 B2 | 7/2007 | Wang et al. | |
| 7,280,530 B2 | 10/2007 | Chang et al. | |
| 7,304,984 B2 | 12/2007 | Butler et al. | |
| 7,305,229 B2 | 12/2007 | Fox et al. | |
| 7,349,698 B2 | 3/2008 | Gallagher et al. | |
| 7,369,859 B2 | 5/2008 | Gallagher | |
| 7,400,881 B2 | 7/2008 | Kallio | |
| 7,471,655 B2 | 12/2008 | Gallagher et al. | |
| 7,483,374 B2 | 1/2009 | Nilakantan et al. | |
| 7,593,415 B2 | 9/2009 | Li et al. | |
| 7,639,601 B2 | 12/2009 | Rabipour et al. | |
| 7,729,346 B2 | 6/2010 | Lee et al. | |
| 7,792,096 B2 | 9/2010 | Doleh et al. | |
| 2001/0036158 A1 | 11/2001 | Hallenstal et al. | |
| 2001/0043577 A1 | 11/2001 | Barany et al. | |
| 2002/0001302 A1 | 1/2002 | Pickett | |
| 2002/0013147 A1 | 1/2002 | Fauconnier et al. | |
| 2002/0019881 A1 | 2/2002 | Bokhari et al. | |
| 2002/0027930 A1 | 3/2002 | Huh et al. | |
| 2002/0049860 A1 | 4/2002 | Koistinen | |
| 2002/0054571 A1 | 5/2002 | Falsafi | |
| 2002/0072364 A1 | 6/2002 | Tamura | |
| 2002/0106029 A1 | 8/2002 | Bunn et al. | |
| 2002/0118673 A1 | 8/2002 | Abrishami et al. | |
| 2003/0005106 A1 | 1/2003 | Isoda | |
| 2003/0032440 A1 | 2/2003 | Sato et al. | |
| 2003/0058822 A1 | 3/2003 | Jou | |
| 2003/0063569 A1 | 4/2003 | Kalliokulju et al. | |
| 2003/0072273 A1 | 4/2003 | Aiello et al. | |
| 2003/0093509 A1 * | 5/2003 | Li et al. | 709/223 |
| 2003/0112796 A1 | 6/2003 | Kwan | |
| 2003/0117954 A1 | 6/2003 | De Neve et al. | |
| 2003/0123466 A1 | 7/2003 | Somekh et al. | |
| 2003/0123485 A1 | 7/2003 | Yi et al. | |
| 2003/0133423 A1 | 7/2003 | LaDue | |
| 2003/0134653 A1 | 7/2003 | Sarkkinen et al. | |
| 2003/0135376 A1 | 7/2003 | Harada | |
| 2003/0135784 A1 | 7/2003 | Yamaguchi et al. | |
| 2003/0189270 A1 | 10/2003 | Wandel et al. | |
| 2003/0210659 A1 | 11/2003 | Chu et al. | |
| 2003/0233274 A1 * | 12/2003 | Urken et al. | 705/12 |
| 2004/0008652 A1 | 1/2004 | Tanzella et al. | |
| 2004/0010582 A1 | 1/2004 | Oliver | |
| 2004/0037224 A1 | 2/2004 | Choi et al. | |
| 2004/0037314 A1 | 2/2004 | Spear | |
| 2004/0047364 A1 | 3/2004 | Briggs et al. | |
| 2004/0066745 A1 * | 4/2004 | Joe | 370/235 |
| 2004/0073424 A1 | 4/2004 | Geppert et al. | |
| 2004/0090989 A1 | 5/2004 | Kobayashi | |
| 2004/0100914 A1 | 5/2004 | Hellwig et al. | |
| 2004/0101125 A1 | 5/2004 | Graf et al. | |
| 2004/0110539 A1 | 6/2004 | El-Maleh et al. | |
| 2004/0114588 A1 | 6/2004 | Bhaskaran | |
| 2004/0114626 A1 * | 6/2004 | Cline et al. | 370/468 |
| 2004/0114922 A1 | 6/2004 | Hardee | |
| 2004/0131025 A1 | 7/2004 | Dohler et al. | |
| 2004/0131051 A1 | 7/2004 | Rabipour et al. | |
| 2004/0133419 A1 | 7/2004 | El-Maleh et al. | |
| 2004/0136447 A1 * | 7/2004 | LeBlanc | 375/222 |
| 2004/0196867 A1 | 10/2004 | Ejzak et al. | |
| 2004/0208132 A1 | 10/2004 | Neulist et al. | |
| 2004/0228279 A1 | 11/2004 | Midtun et al. | |
| 2004/0252681 A1 | 12/2004 | Rabipour et al. | |
| 2004/0254786 A1 | 12/2004 | Kirla et al. | |
| 2004/0266426 A1 | 12/2004 | Marsh et al. | |
| 2004/0267897 A1 | 12/2004 | Hill et al. | |
| 2005/0007973 A1 | 1/2005 | Jang et al. | |
| 2005/0013281 A1 | 1/2005 | Milton et al. | |
| 2005/0013286 A1 | 1/2005 | Holland et al. | |
| 2005/0027948 A1 | 2/2005 | Marlan et al. | |
| 2005/0048973 A1 | 3/2005 | Hou et al. | |
| 2005/0064907 A1 | 3/2005 | Nealon | |
| 2005/0073977 A1 | 4/2005 | Vanghi et al. | |
| 2005/0074017 A1 | 4/2005 | Qian et al. | |
| 2005/0084094 A1 | 4/2005 | Gass et al. | |
| 2005/0085181 A1 | 4/2005 | Tao | |

| | | | |
|---|---|---|---|
| 2005/0099940 | A1 | 5/2005 | Ohenoja et al. |
| 2005/0105512 | A1 | 5/2005 | Myhre et al. |
| 2005/0157823 | A1 | 7/2005 | Sudhakar |
| 2005/0172013 | A1 | 8/2005 | Tan et al. |
| 2005/0185604 | A1 | 8/2005 | Agarwal |
| 2005/0195829 | A1 | 9/2005 | Ward |
| 2005/0232232 | A1 | 10/2005 | Farber et al. |
| 2005/0265279 | A1 | 12/2005 | Markovic et al. |
| 2005/0267746 | A1 | 12/2005 | Jelinek et al. |
| 2005/0286466 | A1 | 12/2005 | Tagg et al. |
| 2006/0046658 | A1 | 3/2006 | Cruz et al. |
| 2006/0050664 | A1 | 3/2006 | Guey |
| 2006/0062225 | A1 | 3/2006 | Li |
| 2006/0067221 | A1 | 3/2006 | Lee et al. |
| 2006/0072555 | A1 | 4/2006 | St. Hilaire et al. |
| 2006/0092927 | A1 | 5/2006 | Li et al. |
| 2006/0133353 | A1 | 6/2006 | Wang et al. |
| 2006/0154686 | A1 | 7/2006 | Sarkkinen et al. |
| 2006/0193289 | A1 | 8/2006 | Ronneke et al. |
| 2006/0198347 | A1 | 9/2006 | Hurtta et al. |
| 2006/0209873 | A1* | 9/2006 | Knabchen et al. ............ 370/443 |
| 2006/0229068 | A1 | 10/2006 | Niemela et al. |
| 2006/0268845 | A1 | 11/2006 | He et al. |
| 2006/0268888 | A1 | 11/2006 | Liu et al. |
| 2006/0286871 | A1 | 12/2006 | Suumaki et al. |
| 2006/0291454 | A1 | 12/2006 | Ali |
| 2006/0291483 | A1 | 12/2006 | Sela |
| 2007/0011727 | A1 | 1/2007 | Mielenz et al. |
| 2007/0041360 | A1 | 2/2007 | Gallagher et al. |
| 2007/0043558 | A1 | 2/2007 | Schwarz et al. |
| 2007/0123196 | A1 | 5/2007 | Tamura |
| 2007/0127357 | A1 | 6/2007 | Tamura |
| 2007/0127436 | A1 | 6/2007 | Karimi-Cherkandi et al. |
| 2007/0135165 | A1 | 6/2007 | Junghanns et al. |
| 2007/0140214 | A1 | 6/2007 | Zoltan |
| 2007/0140293 | A1 | 6/2007 | Agarwal et al. |
| 2007/0171841 | A1 | 7/2007 | Witzel et al. |
| 2007/0186002 | A1 | 8/2007 | Campbell et al. |
| 2007/0286082 | A1 | 12/2007 | Hikspoors et al. |
| 2008/0008312 | A1 | 1/2008 | Ganesamoorthi et al. |
| 2008/0039087 | A1 | 2/2008 | Gallagher et al. |
| 2008/0102794 | A1 | 5/2008 | Keevill et al. |
| 2008/0123596 | A1 | 5/2008 | Gallagher et al. |
| 2008/0151845 | A1 | 6/2008 | Jaakkola et al. |
| 2008/0225765 | A1 | 9/2008 | Marinier et al. |
| 2008/0240079 | A1 | 10/2008 | Chu et al. |
| 2008/0288245 | A1 | 11/2008 | El-Maleh et al. |
| 2008/0293416 | A1 | 11/2008 | Yi et al. |
| 2008/0316980 | A1 | 12/2008 | Ahlen et al. |
| 2010/0305943 | A1 | 12/2010 | Witzel et al. |

FOREIGN PATENT DOCUMENTS

| | | |
|---|---|---|
| CN | 1504039 A | 6/2004 |
| DE | 198 29 822 A1 | 1/2000 |
| EP | 0 907 280 A2 | 4/1999 |
| EP | 1 017 217 A2 | 7/2000 |
| EP | 1 0 76 466 A1 | 2/2001 |
| FI | 20011715 | 2/2003 |
| GB | 2363295 | 12/2001 |
| GB | 2 389 486 A | 12/2003 |
| WO | WO 99/291326 | 6/1999 |
| WO | WO 99/40569 | 8/1999 |
| WO | WO 00/51330 | 8/2000 |
| WO | WO 00/70885 | 11/2000 |
| WO | WO 01/26390 A1 | 4/2001 |
| WO | WO 02/052414 | 7/2002 |
| WO | WO 03/019961 | 3/2003 |
| WO | WO 03/043299 A1 | 5/2003 |
| WO | WO 03/103313 A1 | 12/2003 |
| WO | WO 2004/019568 | 3/2004 |
| WO | WO 2004/075582 A1 | 9/2004 |
| WO | WO 2005/050960 A1 | 6/2005 |
| WO | WO 2005/089055 | 9/2005 |
| WO | WO 2007/061548 A1 | 5/2007 |

OTHER PUBLICATIONS

"Series G: Transmission Systems and media, Digital Systems and Networks", ITU-T, G.161, International Telecommunication Union, (Jun. 2004).

"Digital Cellular Telecommunications System (Phase 2+); Universal Mobile Telecommunications system (UMTS)l Inband Tandem Free Operation (TFO) of Speech Codecs" (Dec. 2004), ETSI TS 128 062 v. 6.1.0, European Telecommunications Standards Institute (2004).

"Rationale for Reverse Direction Capability List", Study Group 16, ITU—Telecommunication Standardization Sector, Nortel Networks (Nov. 2005).

Notice of Allowance and Fee(s) Due for U.S. Appl. No. 10/599,088 (Sep. 27, 2010).

Notice of Allowance and Fee(s) Due for U.S. Appl. No. 11/282,943 (May 6, 2010).

Official Action for U.S. Appl. No. 10/599,088 (Mar. 25, 2010).

Interview Summary for U.S. Appl. No. 11/282,943 (Mar. 11, 2010).

Notice of Panel Decision from Pre-Appeal Brief Review for U.S. Appl. No. 10/599,088 (Jan. 22, 2010).

Final Official Action for U.S. Appl. No. 11/282,943 (Jan. 22, 2010).

Interview Summary for U.S. Appl. No. 11/282,943 (Oct. 1, 2009).

Final Official Action for U.S. Appl. No. 11/282,943 (Jun. 22, 2009).

Final Official Action for U.S. Appl. No. 10/599,088 (Jun. 4, 2009).

Interview Summary for U.S. Appl. No. 11/282,943 (Apr. 8, 2009).

Official Action for U.S. Appl. No. 10/599,088 (Nov. 5, 2008).

Official Action for U.S. Appl. No. 11/282,943 (Oct. 28, 2008).

Notification of Transmittal of the International Search Report and the Written Opinion of the International Searching Authority, or the Declaration for International Application No. PCT/US2006/041065 (Apr. 26, 2007).

International Search Report for PCT/IB2005/000730 (Oct. 3, 2005).

Yoo et al., "A Media Stream Processing of VoIP Media Gateway," IEEE, p. 91-94, Publication Date: Sep. 2003.

"Implementing Media Gateway Control Protocols," RADVision, pp. 1-16 (Jan. 27, 2002).

Official Action for U.S. Appl. No. 10/599,088 (Feb. 24, 2011).

Final Official Action for U.S. Appl. No. 10/782,754 (Feb. 15, 2011).

Official Action for U.S. Appl. No. 10/782,754 (Aug. 3, 2010).

Official Action for U.S. Appl. No. 10/782,754 (Feb. 26, 2010).

Official Action for U.S. Appl. No. 10/782,754 (Sep. 4, 2009).

"3$^{rd}$ Generation Partnership Project; Technical Specification Group Services and System Aspects; Comfort Nosie Aspects for Enhanced Full Rate (EFR) Speech Traffic Channesl (Release 7)," 3GPP TS 46.062 V7.0.0 (Jun. 2007).

"3$^{rd}$ Generation Partnership Project; Technical Specification Group Services and System Aspects; Enhanced Full Rate (EFR) Speech Transcoding (Release 7)," 3GPP Ts 46.060 V7.0.0 (Jun. 2007).

3$^{rd}$ Generation Partnership Project; Technical Specification Group Services and System Aspects; Inband Tandem Free Operation (TFO) of Speech Codecs; Service Description; Stage 3 (Release 7) 3GPP Ts 28.062 V7.0.0, pp. 1-183 (Jun. 2007).

Series G: Transmission Systems and Media, Digital Systems and Networks; Digital Terminal Equipments— Coding of Analogue Signals by Methods Other than PCM; Coding of Speech at 8 kbit/s Using Conjugate-Structure Algebraic-Code-Excited Linear Prediction (CS-ACELP), pp. 1-146 (Jan. 2007).

"3$^{rd}$ Generation Partnership Project; Technical Specification Group Core Network and Terminals; Core Network Nb Interface user Plane Protocols (Release 5)," 3GPP Ts 29.415 V5.2.0, pp. 1-14 (Dec. 2006).

"Series H: Audiovisual and Multimedia Systems; Infrastructure of Audiovisual Series—Communication Procedures; Gateway Control Protocol: Version 3," ITU-T H.248.1, pp. 1-206 (Sep. 2005).

"3$^{rd}$ Generation Partnership Project; Technical Specification Group Services and System Aspects; Vocabulary for 3GPP Specification (Release 7)," 3GPP Tr 21.905 V7.0.0, pp. 1-54 (Sep. 2005).

"Third Generation Partnership Project; Technical Specification Group Core Network and Terminals; Interworking Between the IP Multimedia (IM) Core Network (CN) Subsystem and Circuit Switched (CS) Networks (Release 6)" 3GPP Ts 29.163, pp. 1-128 (Jun. 2005).

Agilent Technologies, "UMTS Network and Service Assurance," International Engineering Consortium, http://www.iec.org/online/tutorials/agilent_umts_network/topic03.html, pp. 1-4 (Copyright 2005).

"Digital Cellular Telecommunications System Phase (2+); Universal Mobile Telecommunications System (UMTS); AMR Speech Codec, Wideband; Interface to lu and Uu (3GPP Ts 26.202 version 6.0.0 Release 6)," Global System for Mobile Communications ETSI TS 126 202, pp. 1-14 (Dec. 2004).

3rd Generation Partnership Project; Technical Specification Group Services and System Aspects; Mandatory Speech Codec Speech Processing Functions; Adaptive Multi-Rate (AMR) Speech Codec Frame Structure (Release 6), 3GPP Ts 26.101 V6.0.0, pp. 1-20 (Sep. 2004).

International Search Report and Written Opinion of PCT/CA2004/000300 mailed on Jul. 15, 2004.

R.L. Bunting (Editor), "Transcoder Free Operation," 3rd Generation Partnership, Version 1.0, Project 2 (Mar. 18, 2004).

Partial International Search Report, PCT/CA03/00972 (Nov. 3, 2003).

"3rd Generation Parnetship Project; Technical Specification Group Radio Access Network; UTRAN lu Interface User Plane Protocols (Release 4)," 3GPP Ts 25.415 V4.7.0, pp. 1-62 (Dec. 2002).

Sjoberg et al., "Real-Time Transport Protcol (RTP) Payload Format and File Storage Format for the adaptive Multi-Rate (AMR) and Adaptive Multi-Rate Wideband (AMR-WB) Audio Codecs," Network Working Group, http://www.apps.iettorg/rfc/rfc3267html, pp. 1-48 (Jun. 2002).

ETSI: Digital Cellular Telecommunication System (Phase 2+) (GSM); Universal Mobile Telecommunications System (UMTS): Inband Tandem Free Operation (TFO) of Speech Codecs; Service Description; Stage 3 (3GPP Ts 28.062 version 5.0.0 Release 5) Etsi Ts 28 062 V5.0.0, xx,xx, Mar. 2002, pp. 14-19, 35-51, 56-59, 81-88, 164-168, XP002248624.

"3rd Generation Partnership Project; Technical Specification Group Core Network; Bearer-independent Circuit-Switched Core Network; Stage 2 (Release 4)," 3GPP TS 23.205 V4.4.0, pp. 1-183 (Mar. 2002).

3rd Generation Partnership Project; Technical Specification Group Services and System Aspects; Inband Tandem Free Operation (TFO) of Speech Codecs; Service Description; Stage 3 (Release 5), 3GPP TS 28.062 V5.0.0, pp. 1-175 (Mar. 2002).

"3rd Generation Partnership Project; Technical Specification Group Core Network; Out of Band Transcoder Control—Stage 2; (Release 4)," 3GPP TS 23.153 V4.4.0 Release 4, pp. 1-45 (Dec. 2001).

ETSI TS 128 062 V4.2.0 (Dec. 2001) Technical Specification; Digital Cellular Telecommunications System (Phase 2+) (GSM); Universal Mobile Telecommunications System (UMTS); Inband Tandem Free Operation (TFO) of Speech Codecs; Service Description, Stage 3 (3GPP TS 28.062 version 4.2.0 Release 4). (Dec. 2001).

"3rd Generation Partnership Project; Technical Specification Group (TSG) RAN3; Transcoder Free Operation (Release 4)," 3GPP TR 25.953 V4.0.0, pp. 1-15 (Mar. 2001).

Third Generation Partnership Project, Meeting Report v3.0.0, 3GPP TSG-TrFO Workshop#04, pp. 1-18 (Oct. 17-19, 2000).

"Series G: Transmission Systems and Media, Digital Systems and Networks; Digital Transmission Systems—Terminal Equipments—Coding of Analogue Signals by Pulse Code Modulation," ITU-T G.711, Appendix II, pp. 1-18 (Feb. 2000).

ETSI: "Digital Cellular Telecommunications System (Phase2+): Inband Tandem Free Operation (TFO) of Speech Codecs; Service Description; Stage 3 (GSM 04.53 version 1.6.0)" GSM Global System for Mobile Telecommunications, Online, Oct. 1998, pp. 1-69, XP002283034.

"General Aspects of Digital Transmission Systems; Terminal Equipments; Pulse Code Modulation (PCM) of Voice Frequencies," ITU-T G.711, pp. 1-12 (Nov. 1988).

Notice of Allowance and Fee(s) Due for U.S. Appl. No. 10/599,088 (Apr. 11, 2011).

* cited by examiner

| 7 | 6 | 5 | 4 | 3 | 2 | 1 | 0 | Descriptions |
|---|---|---|---|---|---|---|---|---|
| | | | | | | | | Length: 8 bits |
| | | | | | | | | EC field ID: 8 bits |
| | | | 0 | 0 | 0 | 0 | 0 | Tail length specification: 3 bits<br>Comfort noise support: 1 bit<br>TBD padded with 0: 4 bits |
| | | | | | | | | AEC field ID: 8 bits |
| 0 | 0 | 0 | 0 | 0 | 0 | 0 | 0 | TBD padded with 0: 8 bits |
| | | | | | | | | NR field ID: 8 bits |
| 0 | 0 | 0 | 0 | 0 | 0 | 0 | 0 | TBD padded with 0: 8 bits |
| | | | | | | | | AGC field ID: 8 bits |
| | | 0 | 0 | 0 | 0 | 0 | 0 | Support level: 2 bits<br>   00 unconditional support<br>   01 best effort support<br>   10 reserved<br>   11 reserved<br>TBD padded with 0: 6 bits |
| | | | | | | | | Version field |
| | | | 0 | 0 | 0 | 0 | | Direction w.r.t. traffic: 1 bit<br>CRC: 3 bits<br>TBD padded with 0: 4 bits |

PROVIDING A CAPABILITY LIST OF A PREDEFINED FORMAT IN A COMMUNICATIONS NETWORK

CROSS-REFERENCE TO RELATED APPLICATIONS

This claims the benefit under 35 U.S.C. §119(e) of U.S. Provisional Application Ser. No. 60/731,358, entitled "Capability List Design for SNPE Coordination," filed Oct. 28, 2005, which is hereby incorporated by reference.

This is a continuation-in-part of PCT International Application No. PCT/IB2005/000730, entitled "Communicating Processing Capabilities Along a Communications Path," filed Mar. 21, 2005, which claims priority to U.S. Provisional Application Ser. No. 60/554,605, filed Mar. 19, 2004, both hereby incorporated by reference.

TECHNICAL FIELD

The invention relates generally to providing a capability list of a predefined format in a communications network.

BACKGROUND

Information, including data, audio, video, and voice information, can travel in circuit-switched and/or packet-switched forms over different types of networks, including wireline and wireless networks. The various nodes along a communications path may perform various types of processing functions in addition to routing or forwarding the information toward the next node. These features may include signal processing functions, such as controlling gain and providing noise reduction and echo cancellation. In many cases, the various nodes along a particular communications path may provide the same and/or different signal processing functions. For example, multiple nodes may provide echo cancellation and noise reduction, while other nodes may provide gain control. Further, other nodes may provide echo cancellation, noise reduction, and gain control. Accordingly, all of the communication nodes must be properly controlled and coordinated to provide the appropriate functions at the appropriate places and times. If provisioning of these functions is not properly implemented, the information being transferred along the path may be degraded. Such control and coordination is difficult to implement for relatively static conditions, and even more difficult to implement when the communication path dynamically changes, such as when a node fails and rerouting of the communication path is required.

SUMMARY

In general, a method for use in a communications network having plural nodes includes receiving, by a first node, a capability list that has a predefined format and includes plural entries identifying data processing functions supported by one or more nodes along a communications path of a communications session involving the first node. The first node adds at least one additional entry into the capability list in response to determining that the first node supports a data processing function that is not identified in the capability list.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In accordance with some embodiments, an improved coordination protocol among signal processing network equipment (SPNE) in a communications network is provided. This protocol is referred to as an SPNE coordination protocol. Improved coordination among SPNE according to the SPNE coordination protocol is provided by exchanging capability lists identifying capabilities of the SPNE along a communications path, in response to various triggering events. Also, each capability list has a predefined format to provide a modular design for the capability list. The capability list has multiple entries to indicate "data processing functions" supported by SPNE along a communications path. A "data processing function" refers to any one or more of voice enhancement and signal processing functions, with examples being bearer traffic (e.g., voice, data) compression/decompression, automatic level control (or automatic gain control), echo cancellation, noise reduction, and acoustic echo control. In the ensuing discussion, an SPNE is more generally referred to as a "node" of a communications path.

Each entry in the capability list for identifying a data processing function can have a predefined (known) size (e.g., 2 bytes or some other size). An entry is added to a capability list to indicate a particular data processing function supported by a node, assuming that the particular data processing function is not already identified in the capability list. An entry for a particular data processing function will be absent from the capability list if the particular data processing function is not supported by any node in the communications path. Each entry of the capability list carries just information that is relevant to the control of the particular data processing function.

A capability list is also applicable to different transport protocol designs and is bearer independent. For a given communications session (e.g., voice call session, data transfer session, etc.), different types of transports of the communications network may be utilized, with the different types of transports interconnected by nodes. For example, one transport can be based on NbUP/RTP/UDP/IP (UMTS NbUP over Real-Time Protocol/User Datagram Protocol/Internet Protocol), where NbUP is located in a user plane of a core network and is used to convey data between media gateways (MGWs). Other example transports can be based on RFC/RTP/UDP/IP, I.366.2/ATM (I.366.2 trunking format over Asynchronous Transfer Mode), or TDM (time-division multiplexing). In accordance with some embodiments, a capability list is embedded in a payload of a packet or frame according to any of the protocols listed above to enable easy exchange across different types of transports.

Also, in accordance with some embodiments, a capability list has a generic format that allows the capability list to be encapsulated with appropriate information for inter-operability over different network configurations. The capability list can be applied to either in-band signaling (signaling along the communications path of a communications session) or out-of-band signaling (signaling along a path different than the communications path of a communications session).

Other features and characteristics associated with capability lists are discussed further below.

Figure 1:
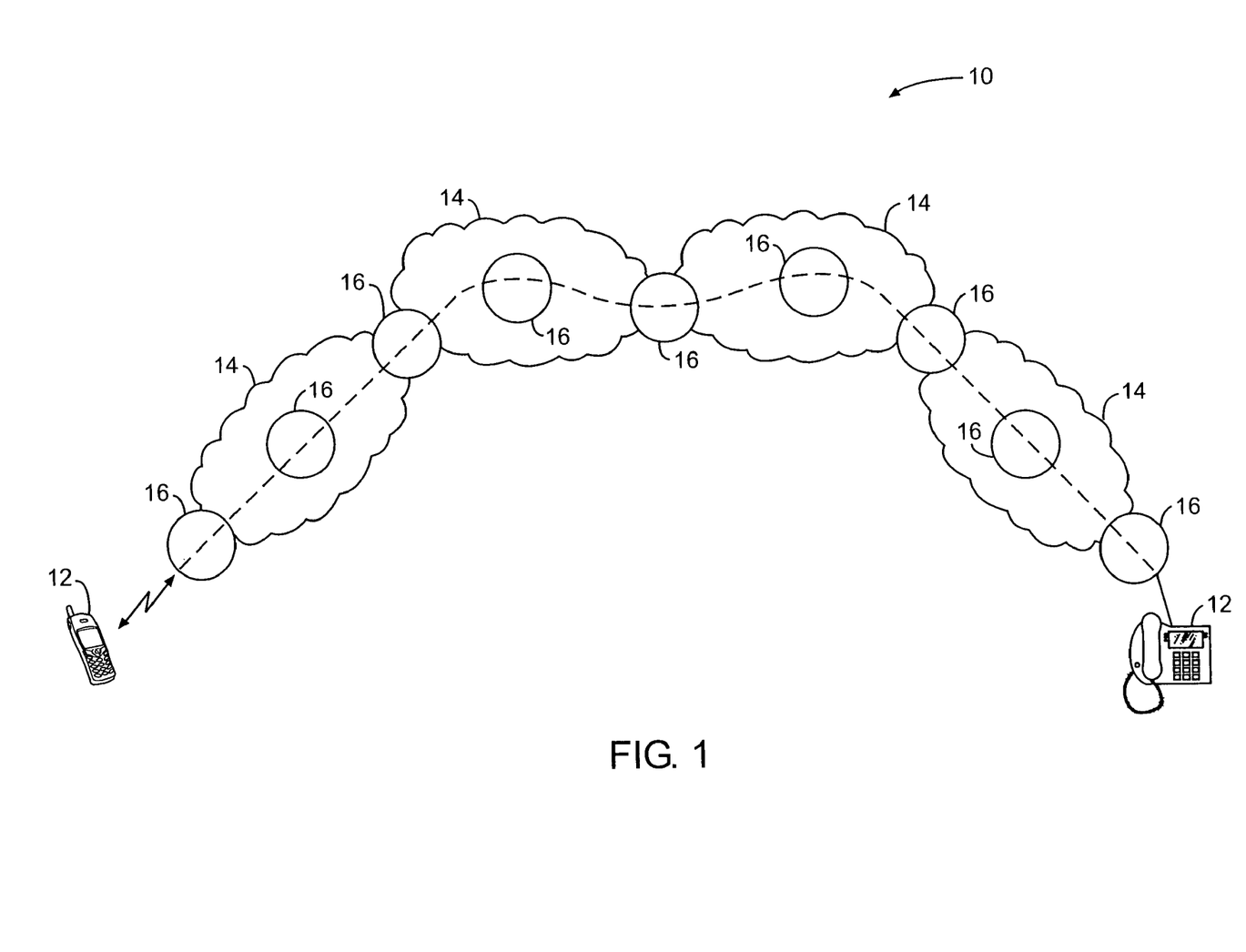
FIG. 1 is a block diagram of a communications environment that can incorporate an embodiment of the invention.

FIG. 1 illustrates a communications environment 10 that has various communications nodes. These nodes include communications terminals 12, which represent the endpoints of a communications path, which extends through various routing nodes 16 between and within several communications networks 14. The communications networks 14 may support various types of communications, wherein the routing nodes 16 between the communications networks 14 may act as media gateways, which facilitate interworking between disparate communications technologies (e.g., interworking between circuit-switched and packet-switched technologies). The routing nodes 16 within the communications networks 14 are used to route traffic along the communications path through a given communications network 14. The routing nodes 16 that interface through wired or wireless communications with the communications terminals 12 represent the respective access points for the associated communications network 14, and facilitate communications with the corresponding communications network 14 and the communications terminals 12. These access points may take the form of wireless local area network (WLAN) access points, wireless wide area networks (WWAN) access points, Ethernet access points, cellular base stations, and the like, or any combination of such nodes. The communications terminals 12 are illustrated as being those supporting voice communications, but other information, including real-time and non-real-time data, may be communicated across the communications path and benefit from the present invention.

Some embodiments of the invention operate to provide end-to-end coordination of data processing functions available at the respective nodes along the communications path, including the routing nodes 16 and the communications terminals 12. The coordination of processing functions along the communications path generally involves one or more of the following. The nodes are able to provide their capabilities to other nodes, as well as obtain the capability of other nodes along the communications path. When multiple nodes can support the same data processing functions, the involved nodes are operable to resolve the conflict and to determine whether or not they should implement a certain data processing function on the data being carried along the communication path. When network topologies change, the affected nodes are operable to effectively update each other relative to these changes. Similarly, the nodes may be operable to control the relative provisioning of data processing functions in a dynamic fashion as would be desired when network changes impact the communications path.

In general, the nodes along the communications path determine each other's relative capabilities to provide various data processing functions, and individually determine whether to implement certain data processing functions in light of a rule set that is available to all the nodes along the communications path. Again, these nodes may also include just the routing nodes 16 forming the communication path, or may include the communications terminals 12. The rule set will address the needs of a particular communications session over a communications path, as well as conflicts amongst nodes, when these nodes can provide the same functionality. In operation, there are a set of predefined data processing functions that may be provided by the various nodes along the communications path. A set of functions is defined and updated for a type of communications session. For example, a set of voice signal processing functions is defined for voice communication applications. A set of video signal processing functions is defined for video communication applications.

For each communications path that is supporting traffic in one direction, each node will provide a capability list to at least the next upstream and downstream nodes along the communications path. When each node receives a capability list from an adjacent node, it will make note of the available data processing functions of the other nodes and forward this information to the respective upstream and downstream nodes. As such, each node along the communications path will ultimately recognize the capabilities of the other nodes along the communications path or at least the fact that other nodes along the communication path, either upstream or downstream, are capable of providing certain data processing functions.

In general, data processing functions should be enabled close to the source of traffic of interest to provide the data processing functions effectively. A capability list exchanged in the same direction as the flow of traffic of interest helps nodes in a communications path to identify the presence of other nodes upstream that are offering similar data processing functions. However, it is also advantageous to exchange capability lists in the opposite direction of the flow of traffic of interest. Note, however, that capability lists exchanged in the opposite direction of the flow of traffic of interest is not intended for negotiation and coordination of functions (such as discontinuous transmission or DTX functions) that require coordinated support by the two endpoints of a communications session.

Generally, note that most communications sessions (e.g., voice call sessions, text chat sessions, and so forth) involve bi-directional traffic flows. Therefore, there are two pairs of forward/reverse capability lists. In other words, for a communications session having a first traffic flow in a first direction (from endpoint A to endpoint B), and a second traffic flow in a second, opposite direction (from endpoint B to endpoint A), there will be a first pair of forward capability list and reverse capability list for the first traffic flow, and a second pair of forward capability list and reverse capability list for the second traffic flow.

Note also that capability lists are exchanged on a per-communications session basis. Each communications session will involve its own set of capability list exchanges among nodes involved in the corresponding communications session.

There are two main reasons to communicate a capability list in the opposite direction of traffic flow: load balancing and position-dependent activation. For load balancing, position-insensitive data processing functions can be relocated from a heavily loaded node to a less loaded node downstream. A position-insensitive data processing function refers to a function that can be implemented anywhere along a communications path. The capability of relocating a data processing function to a different downstream node may be desirable for dynamic handling of wide range of traffic processing requirements and network configurations, including as examples cellular, wireline, WiFi (a wireless local area network technology), or WiBro (wireless broadband), within an operator's network. For load balancing purposes, each entry of a capability list can be tagged with information and conditions on the level of support provided by a particular node.

Figure 2:
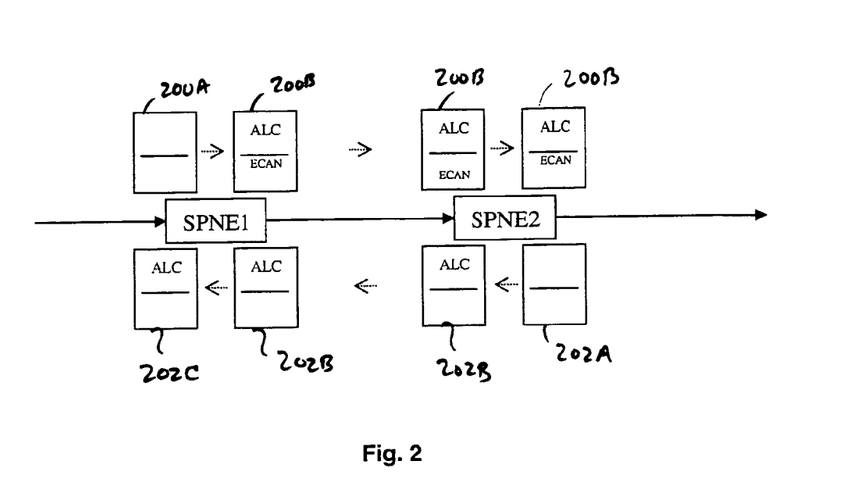
FIG. 2 is a block diagram to illustrate exchanges of forward and reverse capability lists by nodes in a communications path, in accordance with an embodiment.

FIG. 2 shows an example where node SPNE1 is capable of supporting both automatic level control (ALC) and echo canceller (ECAN) functions, and node SPNE2 is capable of supporting ALC also for bearer traffic flowing from SPNE1 to SPNE2 (in the direction indicated by the solid arrows). Node SPNE1 receives or initiates a downstream capability list 200A (which is empty and does not contain entries for data processing functions in the example). Node SPNE1 adds entries corresponding to the ALC and ECAN functions to the capability list 200A, which forms capability list 200B that is sent to node SPNE2.

Upon receiving capability list 200B, node SPNE2 (which supports ALC), notes that an upstream node already supports ALC. Therefore, node SPNE2 does not add another entry to the capability list 200B. Node SPNE2 forwards the capability list 200B further downstream.

A reverse (upstream) capability list is also communicated in the direction opposite to the direction of the traffic flow. Node SPNE2 receives or initiates an upstream capability list 202A, which initially does not have entries identifying data processing functions. Since node SPNE2 supports ALC, node SPNE2 adds an entry to the capability list 202A, where the added entry identifies the ALC function. The updated capability list is capability list 202B, which is forwarded to node SPNE1.

Knowing that the ALC function is also available at an SPNE downstream based on the reverse capability list 202B, node SPNE1 has the following options: (1) continue to provide support for ALC; or (2) relinquish ALC support to relieve itself of signal processing overloading if the ALC function for the current communications session is position insensitive. Node SPNE2 then adds another entry to the capability list 202B to indicate support for the ECAN function, and forwards the updated capability list 202C further upstream. Moreover, being the first SPNE offering an echo canceller function, node SPNE1 continues providing its support of this function which is preferred because it is nearer to the source of the traffic.

In most scenarios, it is desirable to activate data processing functions nearer to the traffic source. In some scenarios, however, it is more desirable to activate data processing functions farther away from the source. One example of the latter scenario is discussed below.

In FIG. 2, it is assumed that the ALCs in both nodes SPNE1 and SPNE2 are feedback ALC (in other words, the ALC target level is dynamically adjusted as a function of the background noise level at the destination endpoint). Furthermore, it is assumed that the destination endpoint (on the right side of FIG. 2) is a mobile station, and further, that node SPNE2 has a noise reduction (NR) function for traffic coming from the destination endpoint. When node SPNE2 provides the NR function to suppress the background noise on bearer traffic from the destination endpoint, feedback ALC processing would be more effective if the ALC function is applied on downstream traffic (traffic from SPNE1 to SPNE2) nearer the destination endpoint before the background noise in the reverse direction is suppressed or modified. Consequently, activating the ALC in node SPNE2 is more preferable than activating the ALC in node SPNE1 although node SPNE1 is closer to the source of traffic. The ability to select node SPNE2 rather than node SPNE1 to apply the ALC function on the downstream traffic is based on a reverse capability list sent in the direction opposite to the traffic flow.

It is noted that support for the SPNE coordination protocol according to some embodiments at any particular node in a communications environment is optional. For example, a media gateway can be configured to provide null, partial, or full support of the SPNE coordination protocol.

Furthermore, a media gateway can provide active support of the SPNE coordination protocol on a subset of interfaces of the media gateway. The number of interfaces providing active support can be selectively defined or configured. For example, a wireless media gateway with one interface to a wireless access network and another interface to an IP core network may be configured to provide no support for the SPNE coordination protocol for traffic communicated with the wireless access network, but can provide active support for the SPNE coordination protocol for traffic communicated with the IP core network.

It is noted that if a media gateway exists that provides no support for the SPNE coordination protocol in a communications path, the SPNE coordination protocol is effectively terminated on both sides of the media gateway. As a result, end-to-end SPNE coordination will not be achieved.

Support for the SPNE coordination protocol can be generally classified into three general types: (1) active support; (2) passive support; and (3) no support. Active support is provided by nodes equipped and capable of offering data processing functions. In active support, a node is capable of initiating, receiving, modifying, and interpreting capability lists through at least one communication interface. Where active support is provided at more than one interface of a node (such as at both interfaces of a media gateway), the node is able to relay the capability lists between the interfaces of the node.

Passive support is provided by nodes not capable of offering data processing functions for bearer traffic. However, in passive support, a node is capable of receiving and relaying capability lists between two interfaces.

A node that provides no support for the SPNE coordination protocol will not initiate, receive, or relay capability lists through an interface with an external network. This type of node should be able to ignore capability lists at an input interface.

As discussed above, capability lists exchanged among nodes in a communications path have various features and characteristics. As discussed above, some of these features and characteristics include: portability of the capability lists to different types of transports; in-band or out-of-band communication of the capability lists; and modular design of a capability list.

In one example of support for in-band communication of a capability list, the capability list can be communicated with in-band signaling over a TDM (time-division multiplex) transport. The in-band communication of a capability list over a TDM transport can co-exist with tandem-free operation (TFO) in-band signaling. In the presence of TFO messages over a TDM connection, a capability list can be encapsulated and exchanged in the form of TFO embedded messages, in one implementation.

In addition, according to an embodiment, the predefined and generic format of a capability list allows inter-operability and communication between nodes that provide active protocol support and passive protocol support. Also, a generic design allows for relatively easy enhancement of the SPNE coordination protocol such that format conversion can be avoided.

A further characteristic of a capability list according to an embodiment is that the capability list is designed to be non-intrusive and non-destructive. A capability list is transparent to any nodes not supporting the SPNE coordination protocol. When a capability list is received by a node of a network that is not capable of supporting the SPNE coordination protocol, the capability list can be dropped and ignored without negative impact on bearer traffic processing, negative impact on control signal processing, and negative impact on the operation of the node (e.g., computation and resource usage).

Other features and characteristics according to some embodiments include a re-transmission feature. Re-transmission of capability lists is supported by a node to ensure proper capability update end-to-end in the communications path. In the event of a capability list transmission failure, the originator of the capability list is notified to re-transmit the capability list to the receiver. Transmission failure notification and capability re-transmission is performed on a hop-by-hop basis to minimize bandwidth consumption.

Another feature or characteristic associated with capability lists is backward compatibility such that any new release of the SPNE coordination protocol is backwards compatible with previous versions of the SPNE coordination protocol. In some embodiments, a version field is provided in a capability list to identify a version of the SPNE coordination protocol. This is provided to facilitate proper identification of protocol capability and content.

Capability lists are also designed to ensure forward compatibility. In the event of a version mismatch, the version field of an outgoing capability list is assigned a value equal to the higher value between the received version and the local support version (so that the capability list is updated to indicate support for the more recent version of the SPNE coordination protocol). Enhanced information or newly defined entries in a capability list is transparent to a node supporting an earlier version of the protocol. A node providing active or passive support to an earlier version of the protocol would be able to relay the un-recognized capability list information without corruption to the information or negative impact on the node itself.

Also, as part of the forward compatibility feature, any node that provides active or passive support for an earlier version of the SPNE coordination protocol and that receives a capability list according to a more recent version of the SPNE coordination protocol will ignore any un-recognized fields in the capability list. The node will also maintain the integrity of the un-recognized fields.

Figure 3:
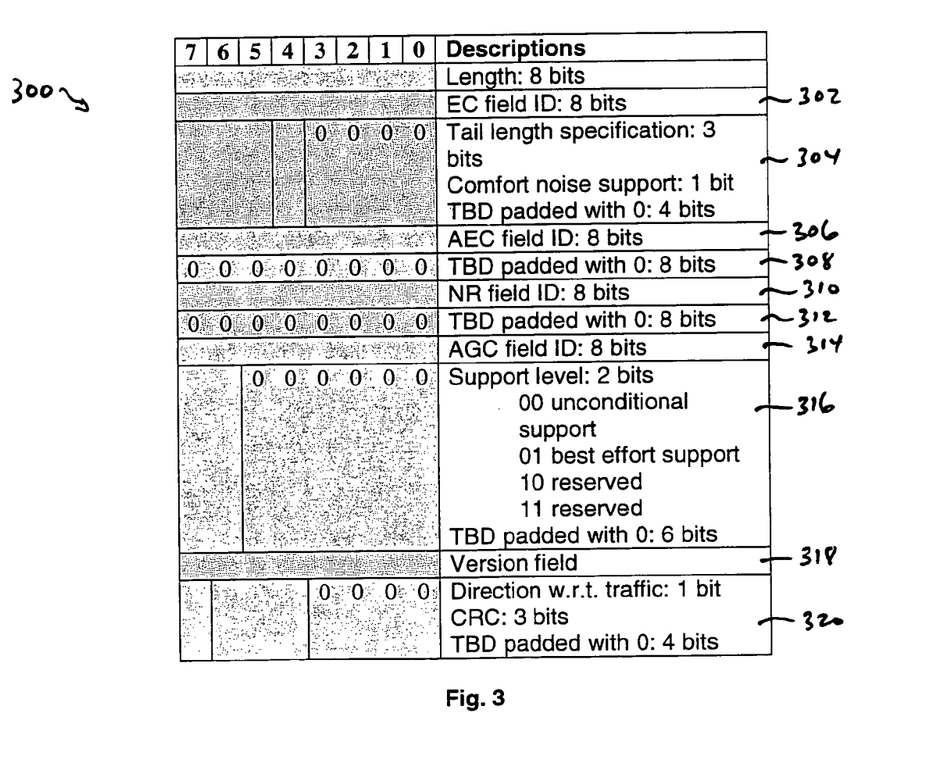
FIG. 3 illustrates an example format of a capability list, according to an embodiment.

FIG. 3 shows an example format of a capability list 300. The example format is provided merely for purposes of discussion, and as capability lists can have other formats in other implementations. The example capability list has an EC (echo canceller) field identifier (ID) 302 to identify an entry associated with the EC function. Another field 304 contains attributes of the corresponding EC function, including tail length specification, comfort noise support, and a reserved field portion. The fields 302 and 304 make up an entry (for the EC function) in the capability list 300 depicted in FIG. 3.

The capability list 300 also includes a field 306 containing an AEC (acoustic echo control) field identifier, and a field 308 containing attributes of the AEC function. Further, the capability list 300 includes a field 310 containing a noise reduction field identifier and a field 312 containing attributes of the noise reduction function. Additionally, the capability list 300 includes a field 314 containing an AGC (automatic gain or level control) field identifier, and a field 316 containing attributes of the AGC function.

In addition, the capability list 300 contains a version field 318 to identify the version of the SPNE coordination protocol associated with the capability list 300. Moreover, the capability list 300 has a field 320 that indicates the direction (forward or reverse) of the capability list. A forward capability list is sent in the direction of the corresponding traffic flow, while a reverse capability list is sent in the direction opposite to the corresponding traffic flow.

In the example format of FIG. 3, each entry of the capability list 300 associated with a particular data processing function is 2 bytes in length, with the first byte identifying the type of data function the entry corresponds to, and the second byte containing values associated with attributes of the respective data processing function. This is one example of a predefined format that allows for easy manipulation and processing of the capability list. Other predefined formats can be utilized in other implementations.

A particular entry is added to the capability list by a node if the node supports the data processing function associated with the particular entry. A particular entry will be absent from the capability list if the corresponding data processing function is not supported by the node. By not adding entries to the capability list for data processing functions not supported by nodes in a communications path, the average size of capability lists can be reduced to conserve network bandwidth usage. When a node is not adding an entry to a particular capability list, then the node can simply forward the particular capability list without processing the capability list.

In operation, capability lists are exchanged by nodes in a communications path in response to various triggering events, including the following: (1) update of a data processing function capability (e.g., new function added, existing function deleted, or existing function modified); (2) relaying of or reacting to a received capability list (received from another node); (3) change in call topology or change in network configuration that affects the communications session (e.g., call transfer to a different user; handover between different wireless access networks, etc.); (4) a heartbeat communication; (5) setup of a communications session; and (6) insertion of a node into a communications path. Capability lists can be exchanged asynchronously.

Figure 4:
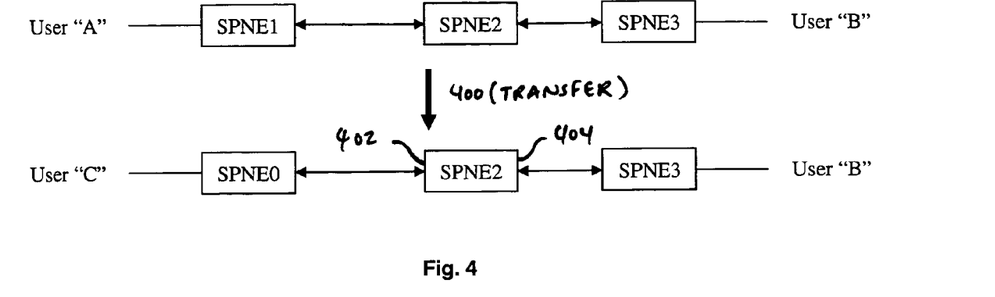
FIG. 4 is a block diagram to illustrate transfer of a communications session between different users.

Note that due to signaling latency and topology change, nodes in a communications session may not all be activated at the same time. A node providing active support of the SPNE coordination protocol participates in the coordination activity by updating capability lists, if necessary, at its earliest convenience. As an example of the above, FIG. 4 shows an initial communications session between user A and user B through a communications path that includes nodes SPNE1, SPNE2, and SPNE3. As part of the communications session setup between users A and B, the appropriate capabilities lists are exchanged. However, at some point during the communications session, the call is transferred (400) from user A to user C, as depicted in FIG. 4. This transfer causes the communications session to be established between user C and user B; note that the transfer also causes node SPNE1 to be removed as a node in the communications path. Node SPNE1 is replaced with node SPNE0, such that the communications session between user C and user B has a communications path that includes nodes SPNE0, SPNE2, and SPNE3. As a result of the transfer (400), capability lists to SPNE2 and SPNE3 are updated by SPNE0 after call transfer has completed.

A further feature of the SPNE coordination protocol according to some embodiments is that a heartbeat mechanism for exchanges of capability lists is provided to maintain integrity of communications between active nodes in a communications session. With the heartbeat mechanism, capability lists are exchanged even in the absence of a capability update by any of the active nodes. To avoid flooding a communications path with heartbeat capability lists sent by all active nodes, the heartbeat mechanism provides for release of heartbeat capability lists in a coordinated manner.

An active node releases a heartbeat capability list at predefined time intervals. Specifically, the active node releases a heartbeat capability list a CTime (time interval) after the last capability list release.

In the example of FIG. 4, node SPNE0 will receive heartbeat capability lists originated by node SPNE3 in the reverse direction after the call transfer (400). As a result, node SPNE0 will have information on data processing functions offered by SPNEs downstream. Without the heartbeat mechanism, node SPNE0 may not become aware of the existence of any nodes downstream or be informed of data processing functions offered by the nodes downstream when there is no service update by nodes SPNE2 and SPNE3.

Also in the example of FIG. 4, if node SPNE0 is not supporting the SPNE coordination protocol, node SPNE0 will not transmit capability lists to node SPNE2. Absence of capability list update and heartbeat from an upstream node after timeout (expiration of the CTime interval) indicates to node SPNE2 that capabilities originally provided by an upstream node may no longer be available. In response to this determination, node SPNE2 will re-activate any data processing function disabled before the call transfer. Node SPNE2 will also transmit capability lists providing an updated list of services applied to the downlink bearer traffic to node SPNE3. In other words, upon expiration of the timeout period (CTime), the node sends a pair of capability lists (forward capability list and reverse capability list) for each traffic flow direction (in other words, two pairs of forward and capability lists are sent when a communications session has bi-directional traffic flow). Thus, effectively, in the absence of receiving a heartbeat capability list from a node (upstream or downstream depending on direction of traffic flow and reverse/forward direction) along a communications path that is expected, a node is able to detect that the node further along the communications path is no longer providing a data processing function that previously was provided by the node.

As noted above, capability lists are also sent by nodes in response to other triggers, including after call setup or after insertion of a node into a communications path (such as due to a handover, a transfer, and other causes). At call setup or upon insertion of a node into a communications path, the node sends a pair of forward and reverse capability lists for data processing functions for each traffic flow direction.

Another trigger that causes the sending of a capability list by a node is a trigger due to an update of a data processing function in the node, where the update includes insertion of a new data processing function, deletion of an existing data processing function, and modification of an existing data processing function. In response to this trigger event, the node also sends a pair of forward/reverse capability lists for each traffic flow direction.

When a node receives a capability list that is different from a previously received capability list at an input termination point, the node replies with the capability list which was previously sent out from that termination point. For example, in the context of FIG. 4, in the communications session between user C and user B, if node SPNE2 receives a capability list (from SPNE0) at input termination point 402 that is different from a capability list previously received at 402 (from SPNE1), then node SPNE2 responds by sending a previous capability list sent out from termination point 402 (this previous capability list was received from SPNE3 through termination point 404 with or without modification by SPNE2). The node also modifies the received capability list (received from SPNE0), if appropriate, with additional data processing functions supported by the node and sends the resulting capability list out of the opposite termination point (point 404 in FIG. 4, for example).

On the other hand, when a node receives a capability list that is identical to a previously received capability list at the same input termination point, the node does not have to respond by sending capability lists from any termination point (to conserve network bandwidth utilization).

Figure 5:
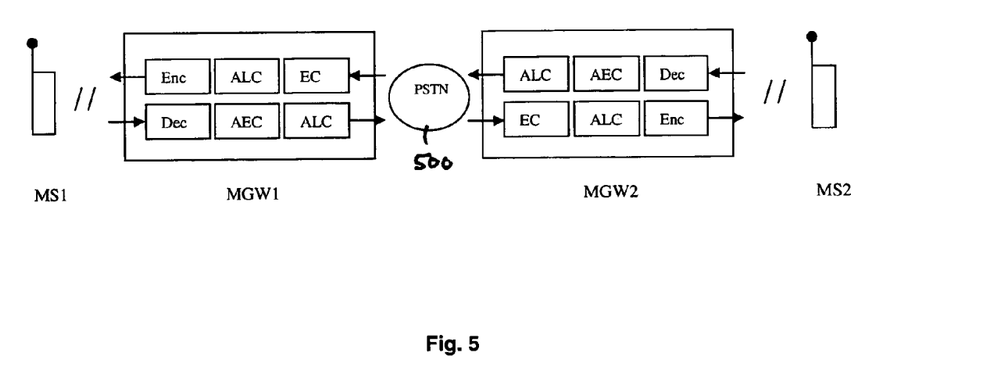
FIG. 5 illustrates an example arrangement of a communications session between two mobile stations.

The following describes example use cases to illustrate the use of capability list exchange in the SPNE coordination protocol, in accordance with some embodiments. FIG. 5 shows a communications session established between two mobile stations MS1 and MS2, where the communications path includes two media gateways (MGW1 and MGW2) that are interconnected by a PSTN (public-switched telephone network) 500. The media gateways MGW1 and MGW2 are nodes that are assumed to support the SPNE coordination protocol. The media gateway MGW1 serves mobile station MS1, while the media gateway MGW2 serves mobile station MS2.

As depicted in FIG. 5, media gateway MGW1 supports the following data processing functions for traffic flow from MS1 to MS2: decoding (e.g., low bit rate decoding); acoustic echo control (AEC); and automatic level control (ALC). The media gateway MGW1 supports the following data processing functions for traffic flow from MS2 to MS1: encoding (e.g., low bit rate encoding); network echo cancellation (EC); and automatic level control (ALC). Also note that in the example discussed below, the ALC function is not a feedback ALC function.

Media gateway MGW2 supports the following data processing functions for traffic flow from MS1 to MS2: encoding (e.g., low bit rate encoding); network echo cancellation (EC); and automatic level control (ALC). The media gateway MGW2 supports the following data processing functions for traffic flow from MS2 to MS1: decoding (e.g., low bit rate decoding); acoustic echo control (AEC); and automatic level control (ALC).

In the example, capability lists are assumed to be exchanged using in-band messages over TDM. Note that in the discussed example, MGW1 supports TFO negotiation but MGW2 does not. It is assumed that TFO in-band signaling messages have higher priority than SPNE coordination in-band signaling messages. If TFO is not successfully negotiated and established or if TFO is not supported, SPNE coordination message can still be attempted. When TFO is successfully negotiated, traffic exchange is in low bit rate compressed format, and nodes in the communications path are assumed to be disabled. If in-band SPNE coordination is desired after TFO is successfully established, SPNE coordination in-band messages can be carried by the "TFO Embedded Message" mechanism (defined by ETSI TS 128 062, entitled "Inband Tandem Free Operation (TFO) of Speech Codecs; Service Description", v 6.1.0, published in December 2004).

Figure 6:
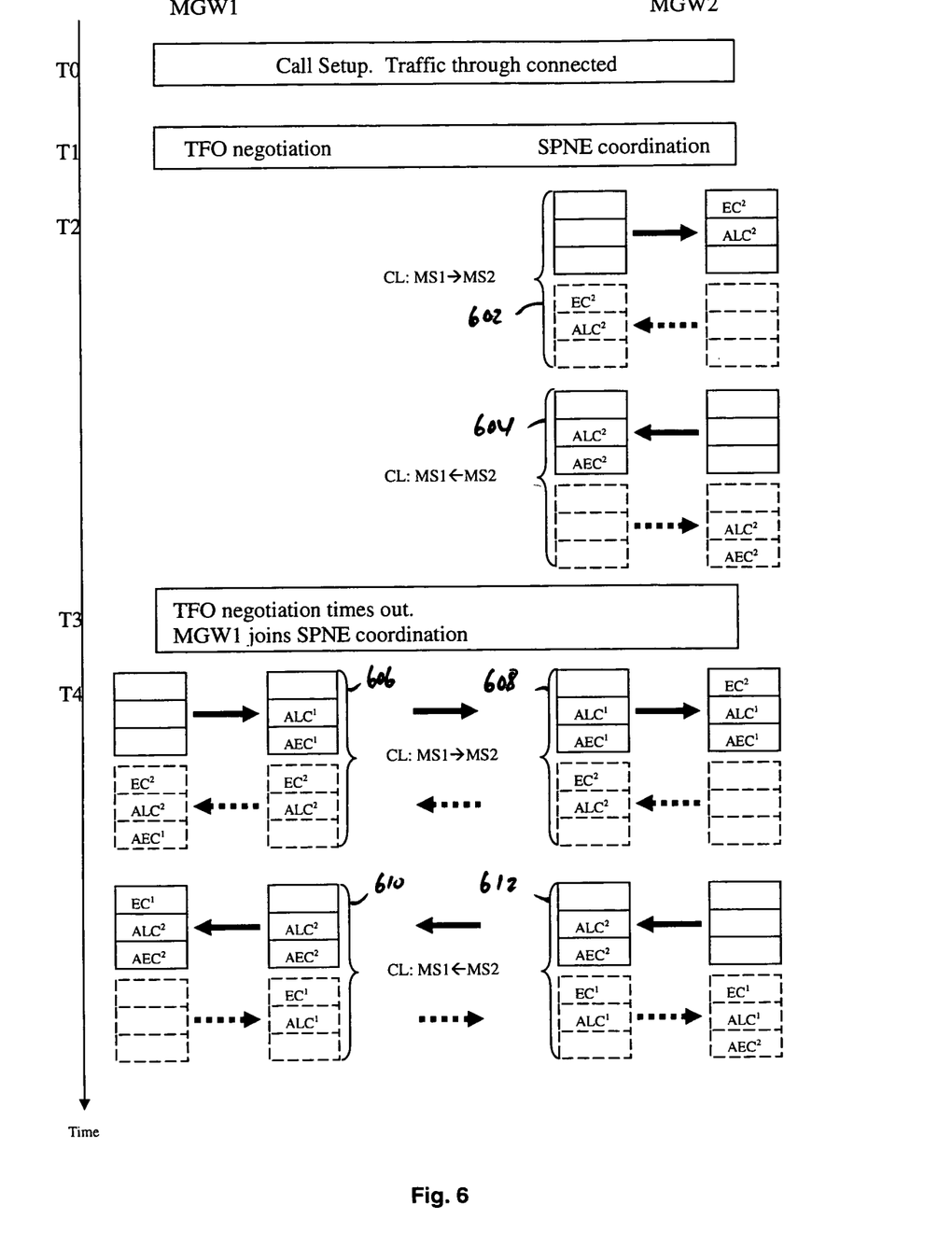
FIG. 6 is a message flow diagram to illustrate coordination between nodes involved in the communications session of FIG. 5, according to an embodiment.

FIG. 6 illustrates the message flows of the mobile-mobile call to provide SPNE capability coordination. In the example, an empty capability list on input to a node indicates no data processing function is supported by other nodes or there is no other node on the input side. The following notations are used (the acronyms CL and MS are used for capability list and mobile station, respectively). Also, CL: MS1→MS2 indicates that capability lists are for functions applied to MS1→MS2 traffic, while CL: MS1←MS2 indicates that capability lists are for functions applied to MS1←MS2 traffic.

Also, indicates that a capability list is sent in the forward direction (same as traffic flow), and indicates that data processing function "x" is supported by a node upstream and function "y" is supported by the local node.

On the other hand, indicates that a capability list is sent in the reverse direction (against traffic flow), and indicates that data processing function "x" is supported by a node downstream and function "y" is supported by the local node.

Also, in FIG. 6, the superscript associated with each data processing function in the capability list identifies the node supporting the corresponding data processing function. For example, $ALC^1$ indicates that the ALC function is supported by MGW1 in the example of FIG. 5.

At time T0, call setup is performed, in which media gateway 1 (MGW1) and media gateway 2 (MGW2) are through connected with duplex traffic. At time T1, MGW1 starts TFO negotiation by transmitting TFO in-band messages on TDM traffic toward MGW2, and MGW2 starts SPNE coordination protocol by transmitting messages containing capability lists.

At time T1, MGW1 continues TFO negotiation with no response. MGW2 continues SPNE capability lists transmission with no response. At this time (prior to receiving a capability list from MGW1), MGW2 determines from the capability list exchanges at 602 that MGW2 is the first and last node with EC and ALC support for MS1→MS2 traffic. MGW2 thus continues EC and ALC support for MS1→MS2 traffic. MGW2 determines from the capability list exchanges at 604 that it is the first and last SPNE with ALC and AEC support for MS1←MS2 traffic. MGW2 thus continues ALC and AEC support on MS1←MS2 traffic.

At time T3, MGW1 stops TFO message transmission after timeout. MGW1 monitors MS1←MS2 traffic from PSTN for TFO messages. MGW1 also starts SPNE coordination protocol. MGW1 transmits SPNE messages and monitors for incoming SPNE messages.

At time T4, capability information exchange has reached a steady state. MGW1 determines from capability list exchanges (606) that it is the first and last node with AEC support for MS1→MS2 traffic. MGW1 continues AEC support for MS1→MS2 traffic. MGW1 also determines from capability list exchanges (606) that it is the first but not the last node with ALC on MS1→MS2 traffic.

MGW2 realizes from capability list exchanges (608) that it is not the first but is the last node with ALC support for MS1→MS2 traffic. According to a defined set of rules, MGW1 continues ALC support for MS1→MS2 traffic, and MGW2 discontinues ALC support for MS1→MS2 traffic. MGW2 also determines from the capability list exchanges (608) that it is the first and last node with EC support for MS1 MS2 traffic. MGW2 thus continues EC support for MS1→MS2 traffic.

Likewise, based on the capability list exchanges (610), MGW1, being the first and last node, continues EC support for MS1←MS2 traffic. Based on the capability list exchanges (612), MGW2, being the first and last node, continues AEC support for MS1←MS2 traffic. MGW2, being the first but not the last node, continues ALC on MS1←MS2 traffic (according to a defined set of rules).

Figure 7:
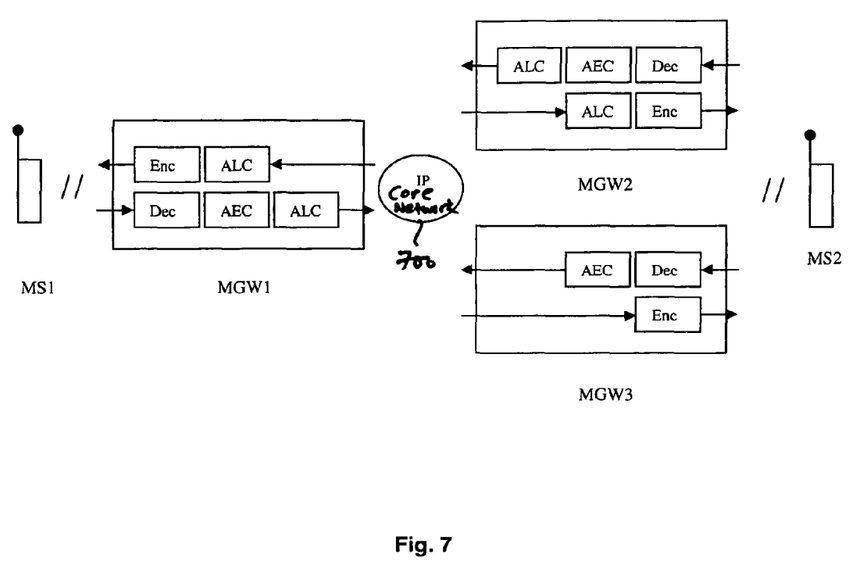
FIG. 7 illustrates another example arrangement of a communications session between two mobile stations.

FIG. 7 illustrates another use case, in which a mobile station MS1 has established a communications session with mobile station MS2 over an IP core network 700. In the example of FIG. 7, media gateway MGW1 serves mobile station MS1. Media gateway MGW2 serves mobile station MS2 before handover (performed in a wireless access network), whereas media gateway MGW3 serves mobile station MS2 after handover. FIG. 7 shows the various data processing functions supported by the media gateways MGW1, MGW2, and MGW3 for traffic flows in the indicated directions (indicated by the arrows).

Figure 8:
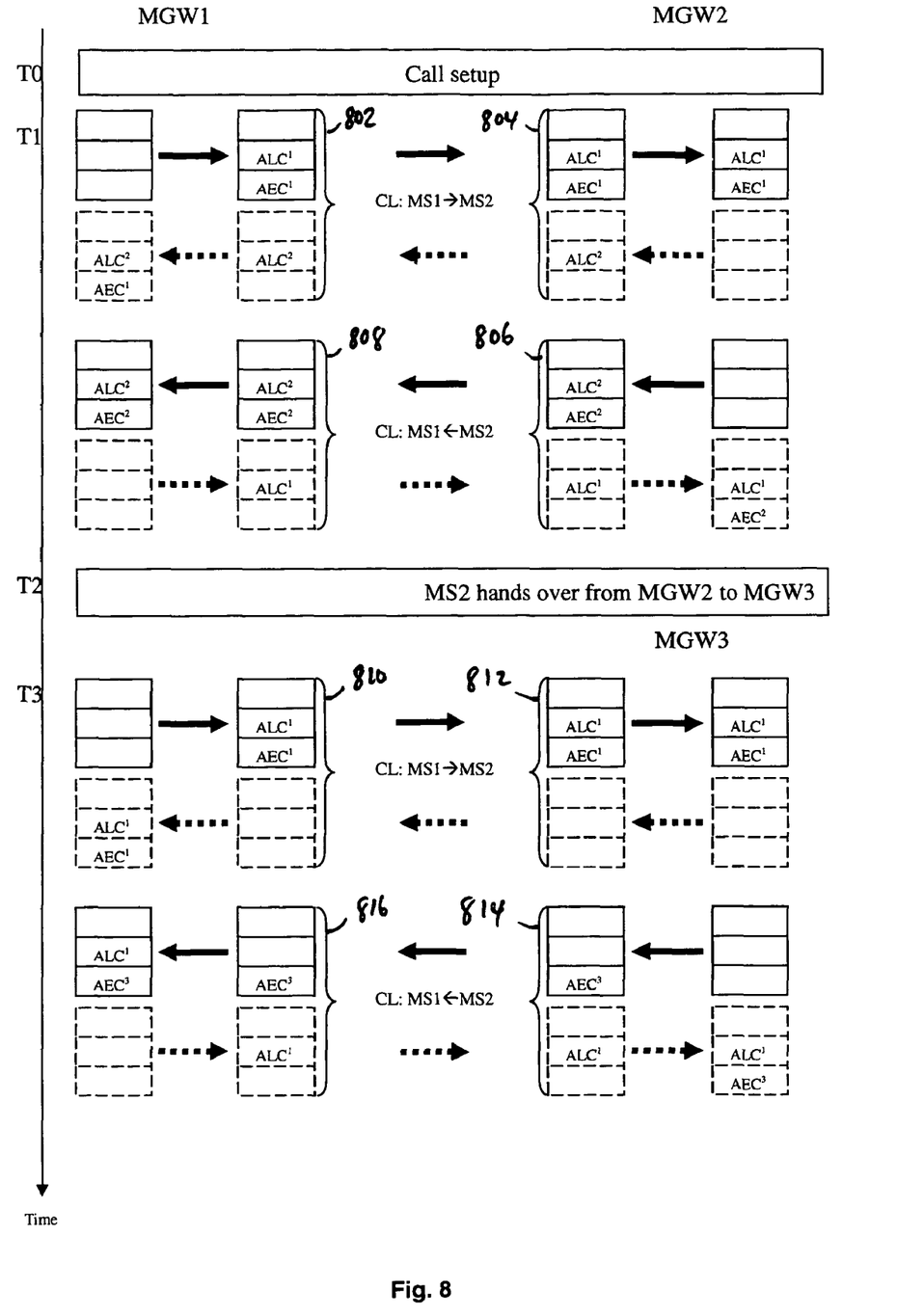
FIG. 8 is a message flow diagram to illustrate coordination between nodes involved in the communications session of FIG. 7, according to an embodiment.

FIG. 8 illustrates the message flows of the mobile-mobile call to provide SPNE coordination. At time T0, call setup is performed between mobile stations MS1 and MS2 through media gateways MGW1 and MGW2, where MGW1 and MGW2 are through connected with duplex traffic.

At time T1, capability information exchange has reached steady state. MGW1 determines from capability list exchanges (802) that it is the first and last node with AEC support for MS1→MS2 traffic. MGW1 continues AEC support for MS1→MS2 traffic. MGW1 also determines from capability list exchanges (802) that it is the first but not the last node with ALC support for MS1 MS2 traffic.

MGW2 determines from capability list exchanges (804) that it is not the first but is the last node with ALC on MS1→MS2 traffic. According to a defined set of rules, MGW1 continues ALC support for MS1→MS2 traffic, and MGW2 discontinues ALC support for MS1→MS2 traffic. Likewise, based on the capability list exchanges (806) MGW2, being the first and last node, continues AEC support for MS1←MS2 traffic. According to a defined set of rules, MGW2, being the first but not the last node, continues ALC support for MS1←MS2 traffic. Moreover, based on capability list exchanges (808), MGW1 discontinues ALC support for MS1←MG2 traffic.

At time T2, MS2 handover takes place such that media gateway MGW3 serves MS2 after the handover. At time T3, capability information exchange has reached steady state. MGW1 determines from capability list exchanges (810) that it is the first and last node with AEC and ALC support for MS1→MS2 traffic. MGW1 thus continues AEC and ALC support for MS1→MS2 traffic as before MS2 handover. MGW1 determines from capability list exchanges (816) that it is the first and last node with ALC support for MS1←MS2 traffic. MGW1 re-enables ALC support for MS1←MS2 traffic after MS2 handover. MGW3 determines from capability list exchanges (814) that it is the first and last node with AEC support for MS1←MS2 traffic. MGW3 continues AEC support for MS1←MS2 traffic after MS2 handover. Note that MGW3 also determines from capability list exchanges (812) that ALC and AEC support are provided for MS1→MS2 traffic upstream.

Figure 9:
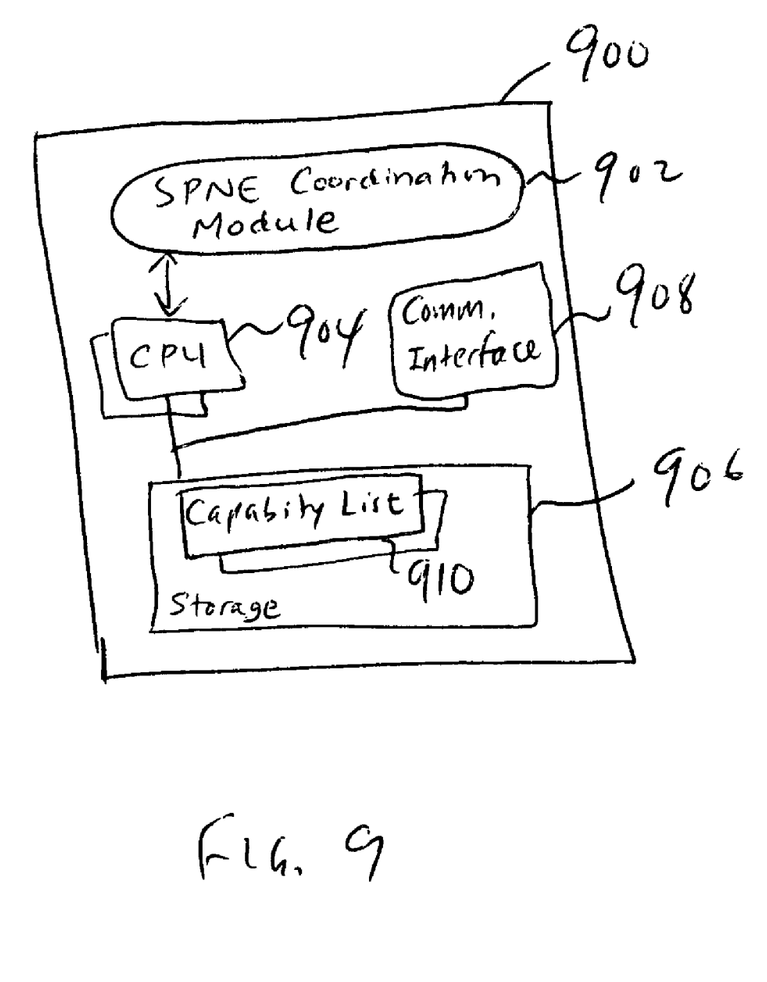
FIG. 9 is a block diagram of a node according to an embodiment.

FIG. 9 illustrates an example arrangement of a node 900 (a terminal or a routing node, for example) that supports the SPNE coordination protocol according to some embodiments. The node 900 includes an SPNE coordination module 902 (which can be implemented as software) to provide tasks associated with SPNE coordination as discussed above. The SPNE coordination module 902 is executable on one or more central processing units (CPUs) 904, which is connected to a storage 906 (volatile memory and/or persistent storage). The storage 906 can store capability lists 910 according to some embodiments received by the node. The node 900 also includes a communications interface 908 to communicate over a network (e.g., wireless network, wireline network, etc.). Note that certain nodes, such as routing nodes, include two communications interfaces for connection to two different networks (e.g., a wireless access network and an IP core network). The two communications interfaces correspond to the two termination points of the node.

Instructions of various software (e.g., including software 902 depicted in FIG. 9) are loaded for execution on corresponding processors (e.g., CPUs 904 in FIG. 9). Processors include microprocessors, microcontrollers, processor modules or subsystems (including one or more microprocessors or microcontrollers), or other control or computing devices.

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method for use in a communications network having plural nodes, comprising:
   receiving, by a first node, a capability list that has a predefined format and includes plural entries identifying corresponding data processing functions supported by one or more other nodes along a communications path of a communications session involving the first node;
   the first node adding at least one additional entry into the capability list in response to determining that the first node supports a data processing function that is not identified in the capability list; and
   wherein the capability list includes entries relating to at least two of the following data processing functions: traffic data encoding and decoding, noise reduction, acoustic echo control, echo cancellation, and automatic level control.

2. The method of claim 1, further comprising:
   the first node performing load balancing of data processing functions among nodes in the communications path.

3. The method of claim 2, wherein performing load balancing comprises
   relocating a particular data processing function applied to traffic in the communications path from the first node to another node in the communications path.

4. The method of claim 1, wherein the received capability list is a forward capability list communicated along a direction of first traffic flow in the communications session, the method further comprising:
   receiving, by the first node, a reverse capability list that has the predefined format, the reverse capability list communicated in a direction opposite to the direction of the first traffic flow.

5. The method of claim 4, wherein the communications session further includes a second traffic flow that is opposite in direction to the first traffic flow, the method further comprising:
   receiving, by the first node, forward and reverse capability lists that have the predefined format for the second traffic flow.

6. The method of claim 4, further comprising:
   the first node determining whether the first node is to be the node to provide a particular data processing function among nodes in the communications path based on the forward and reverse capability lists, wherein the determining is part of position-dependent activation of the particular data processing function among the nodes in the communications path.

7. The method of claim 1, wherein receiving the capability list comprises receiving the capability list in an in-band message of the communications path.

8. The method of claim 1, wherein receiving the capability list comprises receiving the capability list in an out-of-band message with respect to the communications path.

9. The method of claim 1, wherein receiving the capability list comprises receiving the capability list embedded in a payload of a message to allow for communication of the capability list across different types of transports in the communications path.

10. The method of claim 1, further comprising requesting, by the first node, re-transmission of a capability list by a second node in the communications path in response to capability list communication failure.

11. The method of claim 1, wherein receiving the capability list is responsive to one of plural triggering events, the plural triggering events including at least some of: setup of a communications session; update of a data processing function in a node; a heartbeat event; change in a topology of the communications session; and insertion of a node into the communications path.

12. The method of claim 1 wherein the first node comprises a first media gateway and where the capability list is transmitted to the first node by a second media gateway.

13. A node comprising:
   a first termination point and a second termination point;
   a processor; and
   a coordination module executable on the processor to:
      receive, at the first termination point, a first capability list containing entries identifying data processing functions supported by certain nodes in a communications path of a communications session in which the node is involved;
      determine whether the received first capability list is different from a previously received capability list at the first termination point;
      in response to determining that the received first capability list is different from the previously received capability list, send a second capability list previously received from the second termination point, where the second capability list is sent from the first termination point; and
      wherein at least one of the received first capability list, the previously received capability list, and the second capability list includes entries for at least two of the following data processing functions: traffic data encoding and decoding, noise reduction, acoustic echo control, echo cancellation, and automatic level control.

14. The node of claim 13, wherein the coordination module is executable to further:

in response to determining that the received first capability list is different from the previously received capability list, update the first capability list and send the updated first capability list out through the second termination point.

15. The node of claim 14, wherein the coordination module is executable to further:

in response to determining that the received first capability list is identical to the previously received capability list, perform an action to not send out any capability list from the first termination point and the second termination point.

16. The node of claim 13, wherein each of the capability lists has a predefined format and plural entries to identify corresponding data processing functions supported by certain nodes in the communications path.

17. The node of claim 13, wherein the second capability list contains entries identifying data processing functions supported by nodes in the communications path of the communications session in which the node is involved.

18. The node of claim 13 wherein the coordination module receives the first capability list from a first media gateway and wherein the node comprises a second media gateway.

19. An article comprising at least one non-transitory computer readable medium that contains instructions that when executed cause a first node to:

receive a capability list that has a predefined format and includes plural entries identifying corresponding data processing functions supported by one or more other nodes along a communications path of a communications session involving the first node;

add at least one additional entry into the capability list in response to determining that the first node supports a data processing function that is not identified in the capability list; and wherein the capability list includes entries relating to at least two of the following data processing functions: traffic data encoding and decoding, noise reduction, acoustic echo control, echo cancellation, and automatic level control.

20. The article of claim 19, wherein the instructions when executed cause the first node to send a pair of capability lists in different directions of the communications path in response to at least one of: setup of the communications session; update of a data processing function in the first node; a heartbeat event; and insertion of the first node into the communications path.

21. The article of claim 19, wherein the instructions when executed cause the first node to send a pair of capability lists in different directions of the communications path in response to expiration of a predefined time interval.

22. The article of claim 1, wherein the instructions when executed cause the first node to receive the first capability list as part of a payload in a message communicated along the communications path, wherein the first capability list has been communicated through plural different types of transports of the communications path.

23. The article of claim 19 wherein the first node comprises a first media gateway and wherein the capability list is transmitted to the first node by a second media gateway.

\* \* \* \* \*